United States Patent
Bo et al.

(10) Patent No.: US 12,525,409 B2
(45) Date of Patent: Jan. 13, 2026

(54) WIDE VOLTAGE WINDOW AQUEOUS ELECTROLYTE SOLUTION FOR FORMING SEI FILM BASED ON PHYSICAL PROCESS, AND PREPARATION METHOD AND USE THEREOF

(71) Applicant: ZHEJIANG UNIVERSITY, Hangzhou (CN)

(72) Inventors: Zheng Bo, Hangzhou (CN); Huachao Yang, Hangzhou (CN); Meiqi Zhou, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/995,807

(22) PCT Filed: Jul. 18, 2023

(86) PCT No.: PCT/CN2023/107849
§ 371 (c)(1),
(2) Date: Jan. 16, 2025

(87) PCT Pub. No.: WO2024/027499
PCT Pub. Date: Feb. 8, 2024

(65) Prior Publication Data
US 2025/0259801 A1    Aug. 14, 2025

(30) Foreign Application Priority Data
Aug. 5, 2022  (CN) .......................... 202210937540.7

(51) Int. Cl.
*H01G 11/56* (2013.01)
*H01G 11/32* (2013.01)
*H01G 11/84* (2013.01)

(52) U.S. Cl.
CPC ............. *H01G 11/56* (2013.01); *H01G 11/32* (2013.01); *H01G 11/84* (2013.01)

(58) Field of Classification Search
None
See application file for complete search history.

(56) References Cited

U.S. PATENT DOCUMENTS

| | | | |
|---|---|---|---|
| 2009/0311600 A1* | 12/2009 | Minami | H01M 4/62 29/623.5 |
| 2015/0235775 A1 | 8/2015 | Zhu et al. | |
| 2015/0299468 A1* | 10/2015 | Hong | C09B 68/446 552/209 |

FOREIGN PATENT DOCUMENTS

| | | |
|---|---|---|
| CN | 105761946 | 7/2016 |
| CN | 108630446 | 10/2018 |

(Continued)

*Primary Examiner* — Eric W Thomas
(74) *Attorney, Agent, or Firm* — Jiwen Chen; Joywin IP Law PLLC

(57) ABSTRACT

The present invention discloses a wide voltage window aqueous electrolyte solution for forming an SEI film based on a physical process, including: an additive, an electrolyte and water, where the additive is a long-chain compound having both opposite charge functional groups and having opposite wettability; and the electrolyte is a soluble inorganic salt of an alkali metal. The present invention further provides a method for preparing the aqueous electrolyte solution described above and use of the aqueous electrolyte solution in an electrochemical energy storage device, and the electrochemical energy storage device includes a button supercapacitor, a button ionic capacitor or a pouch supercapacitor. According to the present invention, fan SEI layer is formed at an interface through a pure physical electrostatic adsorption process, a free water content at the interface is precisely reduced to inhibit water decomposition, thus maintaining relatively high ionic conductivity while widen- (Continued)

At an interface: waterproof layer

In a bulk phase: self-aggregation ing a voltage window, effectively overcoming the problems of low conductivity of a traditional high-voltage aqueous electrolyte solution and consumption of the electrolyte solution for forming an SEI film based on a chemical process, and realizing the high capacity, long cycle life and excellent rate performance in aqueous energy storage devices.

9 Claims, 3 Drawing Sheets

(56) References Cited

FOREIGN PATENT DOCUMENTS

| KR | 20210033705 | 3/2021 |
|----|-------------|--------|
| WO | WO2018058837 | 4/2018 |
| WO | WO2020241686 | 12/2020 |

* cited by examiner

At an interface: waterproof layer

In a bulk phase: self-aggregation

3-[dimethyl(n-octyl)ammonio]propane-1-sulfonate 3-(decyldimethylammonio)propane-1-sulfonate inner salt Dodecyldimethyl(3-sulfopropyl)ammonium hydroxide

WIDE VOLTAGE WINDOW AQUEOUS ELECTROLYTE SOLUTION FOR FORMING SEI FILM BASED ON PHYSICAL PROCESS, AND PREPARATION METHOD AND USE THEREOF

This is a U.S. national stage application of PCT Application No. PCT/CN2023/107849 under 35 U.S.C. 371, filed Jul. 18, 2023 in Chinese, claiming priority of Chinese Application No. 202210937540.7, filed Aug. 5, 2022, all of which are hereby incorporated by reference.

FIELD OF TECHNOLOGY

The present invention belongs to the field of electrochemical energy storage, and in particular to a wide voltage window aqueous electrolyte solution for forming a solid-electrolyte interphase (SEI) film based on a physical process, and a preparation method and use thereof.

BACKGROUND TECHNOLOGY

Driven by the demand for efficient utilization of intermittent renewable energy and electric vehicles, the development of electrochemical energy storage devices such as batteries and supercapacitors with excellent performance has always been at the forefront of energy technology. Supercapacitors have a wide range of practical application prospects in fields such as electric vehicles, power grids, ports, heavy machinery and large-scale deployment of renewable energy due to their relatively high power density and extremely long cycle life. However, in the face of the growing demand for high-energy applications, the drawback of the relatively low energy density of supercapacitors has led to huge challenges for them.

According to $E \propto V^2$, the energy density E of supercapacitors is proportional to the square of the working voltage V, where V is mainly determined by the irreversible decomposition of the electrolyte solution at the interface. Therefore, in order to improve the energy density of supercapacitors, improving the electrochemical stability window of the electrolyte solution is a very effective approach. At present, organic electrolyte solutions have been widely used in the development of commercial electrochemical energy storage devices. However, due to the drawbacks of toxicity, hygroscopicity, flammability and volatility, the use of organic electrolyte solutions poses significant safety, environmental and cost issues. In contrast, aqueous electrolyte solutions possess outstanding features such as good safety, environmental friendliness, high ionic conductivity, low manufacturing costs and reliable operation under various operating conditions, and are considered the most promising alternatives to organic electrolyte solutions. However, traditional aqueous electrolyte solutions are limited by the relatively low decomposition voltage of water (1.23 V), resulting in a relatively narrow electrochemical stability window, which is extremely disadvantageous for the practical application in electrochemical devices with a high energy density.

In recent years, the strategy of obtaining high-voltage aqueous electrolyte solutions by adding ultra-high concentration solutes to form SEI films and reducing free water molecules has achieved major breakthroughs. However, such ultra-concentrated electrolyte solutions have two main problems: (1) SEI films formed based on a chemical process: the traditional generation of SEI films by adding an extremely high concentration of salts is a method based on a chemical reaction process, so it will be accompanied by the problems of electrolyte solution consumption and reaction process irreversibility. Furthermore, such SEI films are easily destroyed in an aqueous solution environment due to their own water solubility and instability, which imposes an adverse influence on the lifespan and safety of electrochemical devices. (2) relatively low ionic conductivity: the water content of the solvent used to dissociate conductive ions in the super-concentrated solution is too low, resulting in very strong electrostatic attraction between anions and cations, and forming a large number of anion and cation coordination pairs. The appearance of such pairs hinders the transport of charged ions to the two electrodes, thus greatly reducing the conductivity of the solution and impairing the power and rate performance of the devices.

SUMMARY OF THE INVENTION

The object of the present invention is to provide a wide voltage window aqueous electrolyte solution for forming an SEI film based on a physical process, which overcomes the shortcomings of electrolyte solution consumption for a super-concentrated high-voltage aqueous electrolyte solution forming an SEI film based on a chemical process and low ionic conductivity of the solution, and is applicable to aqueous electrochemical energy storage devices with high safety, environmental friendliness and high rate performance. The present invention further provides a method for preparing the aqueous electrolyte solution described above and use of the aqueous electrolyte solution in an electrochemical energy storage device.

The present invention adopts the following technical solutions:

a wide voltage window aqueous electrolyte solution for forming an SEI film based on a physical process, including an additive, an electrolyte and water, where the additive is a long-chain compound having both opposite charge functional groups and having opposite wettability; and the electrolyte is a soluble inorganic salt of an alkali metal.

Preferably, the long-chain compound having both opposite charge functional groups and having opposite wettability is at least one of 3-[dimethyl(n-octyl)ammonio]propane-1-sulfonate ($C_{13}H_{29}NO_3S$), a 3-(decyldimethylammonio) propane-1-sulfonate inner salt ($C_{15}H_{33}NO_3S$) and a dodecyldimethyl (3-sulfopropyl) ammonium hydroxide inner salt ($C_{17}H_{37}NO_3S$).

For the wide voltage window aqueous electrolyte solution for forming an SEI film based on a physical process provided in the present invention: one or more functional additives of 3-[dimethyl(n-octyl)ammonio]propane-1-sulfonate, a 3-(decyldimethylammonio)propane-1-sulfonate inner salt and a dodecyldimethyl (3-sulfopropyl) ammonium hydroxide inner salt are added to a traditional aqueous electrolyte solution. When the device is being charged, under the action of an electric field, the positively charged long-chain hydrophobic structures in the additives will preferentially adsorb on the surface of the negative electrode, and the water molecules on the electrode surface will be attracted by the negatively charged hydrophilic ends of the additives and stay away from the electrode surface due to electrostatic repulsion. Subsequently, due to the electrostatic attraction between molecules, more and more long-chain additive molecules aggregate on the electrode surface end to end. Therefore, a waterproof layer will be formed at the interface between the negative electrode material and the electrolyte solution through a physical electrostatic adsorption process, which is similar to the SEI film in the organic electrolyte solution system and the super-concentrated aqueous electrolyte solution system. This layer hinders the electrolysis of water molecules on the electrolyte surface, thereby improving the electrochemical stability window of the electrolyte solution. Meanwhile, in the bulk phase solution, the additive molecules are more inclined to self-aggregate to form clusters due to the electrostatic interaction between their own positive and negative charges, instead of combining with water molecules and ions in the solution. Therefore, the addition of additives hardly disrupts the original ionic coordination structure in the solution, which is conducive to the rapid transport of ions and enables the solution to maintain a relatively high conductivity. Therefore, the electrolyte solution provided in the present invention can form an SEI film through a pure physical electrostatic adsorption process, maintaining a relatively high ionic conductivity while effectively broadening the voltage window of the aqueous electrolyte solution, and can effectively improve the rate performance and cycle life of aqueous electrochemical energy storage devices, endowing them with excellent electrochemical performance.

Preferably, the soluble inorganic salt of the alkali metal includes at least one of sodium nitrate, potassium nitrate, lithium nitrate and lithium sulfate.

Further preferably, the additive is a 3-(decyldimethylammonio)propane-1-sulfonate inner salt, the soluble inorganic salt of the alkali metal is sodium nitrate, and the electrolyte solution composed thereof has more optimized comprehensive performance.

Preferably, a mass ratio of the inorganic salt to water is 0.1:1 to 0.3:1.

Preferably, a mass ratio of the additive to water is 0.5:1 to 1.5:1, and further preferably 0.6:1 to 1.4:1.

Preferably, an electrochemical window of the wide voltage window aqueous electrolyte solution for forming an SEI film based on a physical process is greater than 1.5 V.

The present invention further provides a method for preparing a wide voltage window aqueous electrolyte solution for forming an SEI film based on a physical process, including steps of:
  (1) mixing a soluble inorganic salt of an alkali metal with water and stirring to prepare a salt solution; and
  (2) adding an additive to the salt solution obtained in step (1) and mixing uniformly to obtain the wide voltage window aqueous electrolyte solution for forming the SEI film based on the physical process.

The present invention further provides use of the wide voltage window aqueous electrolyte solution for forming an SEI film based on a physical process as described above in an electrochemical energy storage device.

The present invention further provides an electrochemical energy storage device, including a wide voltage window aqueous electrolyte solution for forming an SEI film based on a physical process as described above.

Preferably, the electrochemical energy storage device includes a button supercapacitor, a button ionic capacitor or a pouch supercapacitor.

A button supercapacitor is provided. The button supercapacitor is a symmetrical activated carbon button capacitor pressed by a tablet press and consists of a positive electrode shell, a negative electrode shell, a gasket, a spring, a positive electrode material, a negative electrode material, a separator, an electrolyte solution and a current collector. The positive electrode shell, the negative electrode shell, the gasket and the spring are made of stainless steel, the electrode material is a commercial (KURARAY COAL) YP-50F™ activated carbon electrode, the separator is a glass fiber separator, the electrolyte solution is a wide voltage window aqueous electrolyte solution for forming an SEI film based on a physical process described above, and the current collector is a stainless steel mesh.

Preferably, the button supercapacitor has a capacity retention rate of 81.7% (from 36.6 to 29.9 F $g^{-1}$) under a large variation of a current density from 0.5 A $g^{-1}$ to 20 A $g^{-1}$.

A button-type ionic capacitor is provided. The button ionic capacitor is an activated carbon//Ni—Fe Prussian blue (NiHCF) button ionic capacitor pressed by a tablet press. It consists of a positive electrode shell, a negative electrode shell, a gasket, a spring, a positive electrode material, a negative electrode material, a separator, an electrolyte solution and a current collector. The positive electrode shell, the negative electrode shell, the gasket and the spring are made of stainless steel, the positive electrode is a NiHCF electrode, the negative electrode is a commercial (KURARAY COAL) YP-50F™ activated carbon electrode, the separator is a glass fiber separator, the electrolyte solution is a wide voltage window aqueous electrolyte solution for forming an SEI film based on a physical process described above, and the current collector is made of aluminum foil and titanium foil.

Preferably, the button ionic capacitor has a capacity retention rate of 81.5% after 1000 cycles at a low current density of 0.5 A $g^{-1}$.

A pouch supercapacitor is provided. The pouch supercapacitor is a symmetrical activated carbon pouch supercapacitor manufactured in industrial grade and consists of an aluminum-plastic film shell, a positive electrode plate, a negative electrode plate, a tab, an electrolyte solution and a separator located between the positive electrode plate and the negative electrode plate. The electrode plate is obtained through large-scale production by mixing (KURARAY COAL) YP-50F™ activated carbon material/carbon black/SBR/CMC in a weight ratio of 85/10/3/2 to form a slurry, and then going through coating and rolling processes. The separator is a glass fiber separator, the electrolyte solution is a wide voltage window aqueous electrolyte solution for forming an SEI film based on a physical process described above, and the current collector is made of aluminum foil.

Preferably, the pouch supercapacitor has a capacity retention rate of 77% when the rate is increased from 2° C. to 100° C.

Compared with the prior art, the present invention has the following beneficial effects:

The wide voltage window aqueous electrolyte solution for forming an SEI film based on a physical process provided in the present invention adopts safe, non-toxic and low-cost soluble inorganic salts and additives, so that the aqueous electrolyte solution has better economy, safety and sustainability.

The present invention has no special limitation on the method for preparing the wide voltage window aqueous electrolyte solution for forming an SEI film based on a physical process, has simple operation, does not need any purification and drying facilities in preparation and assembly processes, and is conducive to large-scale production.

The wide voltage window aqueous electrolyte solution for forming an SEI film based on a physical process provided in the present invention accurately controls the free water at the interface between the electrode and the electrolyte solution through a pure physical electrostatic adsorption process, and effectively inhibits the electrolysis of water molecules on the surface of the electrode solution, thus maintaining relatively high ionic conductivity while obtaining a wide voltage window. Furthermore, it has good universality and can be applied to most traditional common salt solutions.

The button symmetrical activated carbon supercapacitor provided in the present invention can realize high rate performance of 81.7% under an increase in the current density by 40 times. The button ionic capacitor provided in the present invention can maintain a capacity retention rate of over 80% after 1000 cycles at a low current density of 0.5 A $g^{-1}$, demonstrating excellent electrochemical performance.

DESCRIPTION OF THE EMBODIMENTS

In order to make the present invention more obvious and easier to understand, the technical solution of the present invention will be further described below with reference to the accompanying drawings and specific embodiments. The examples described below are only used to explain the present invention and do not impose any formal or substantial limitations on the present invention.

Figure 1:
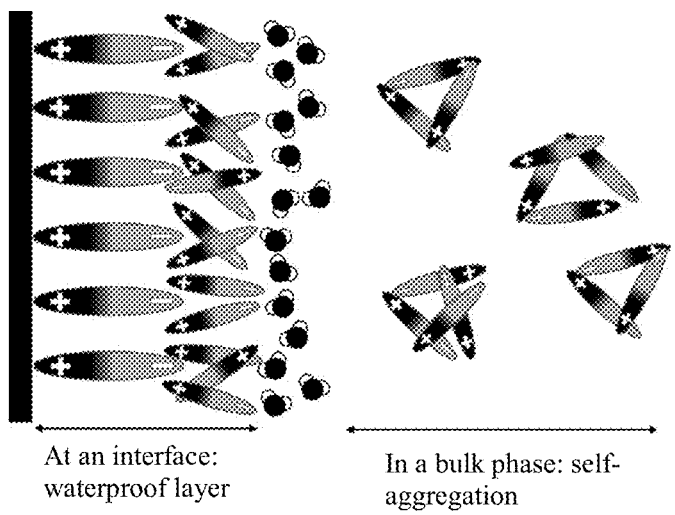
FIG. 1 is a schematic structural diagram of a wide voltage window aqueous electrolyte solution for forming an SEI film based on a physical process provided in the present invention at an interface and in a bulk phase in a device.
Figure 2:
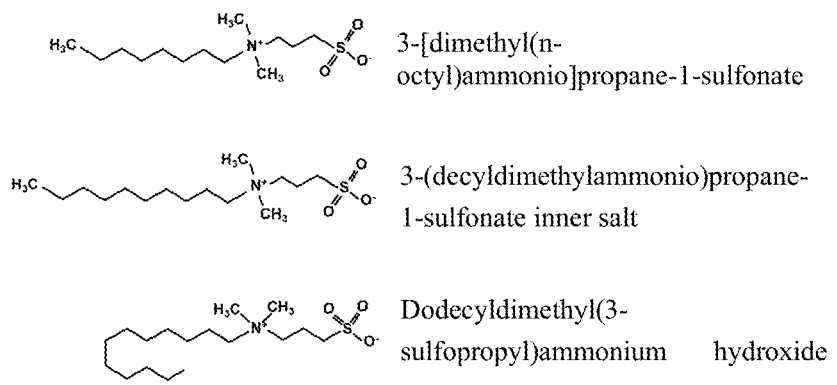
FIG. 2 shows a chemical structural formula of an additive provided in the present invention.

As shown in FIG. 1, the wide voltage window aqueous electrolyte solution for forming an SEI film based on a physical process provided in the present invention includes an additive, an electrolyte and water. The additive is a long-chain compound having both opposite charge functional groups and having opposite wettability. When the electrode is negatively charged, under the action of the Coulomb force, the positively charged hydrophobic groups in the additive molecules will preferentially adsorb on the surface of the negatively charged electrode, and water molecules will be repelled away from the surface of the electrode along with the negatively charged hydrophilic groups in the additive molecules. Subsequently, a large number of additive molecules aggregate to form clusters on the electrode surface due to the intermolecular Coulomb attraction. Therefore, a hydrophobic waterproof SEI film is formed on the electrode surface through a physical adsorption process, which inhibits the electrolysis of water molecules on the electrode surface. In addition, in the bulk phase solution, the long-chain additive molecules tend to aggregate to form clusters end to end due to the electrostatic interaction of their own positive and negative charges, instead of combining with water molecules and electrolyte ions in the solution, so it will not affect the original ionic hydration structure in the solution, which is conducive to maintaining high ionic conductivity.

The following performance tests were conducted on the wide voltage window aqueous electrolyte solution for forming an SEI film based on a physical process provided in the present invention:
1. electrochemical stability window: an electrochemical workstation, model PGSTAT302N (Metrohm Autolab B.V.), was used to test the electrochemical stability window of the aqueous electrolyte solution. Specifically, a three-electrode system composed of the aqueous electrolyte solution, a stainless steel electrode and an Ag/AgCl reference electrode was tested by linear sweep voltammetry, and the current threshold for determining the occurrence of the hydrolysis reaction was 0.3 mA $cm^{-2}$.
2. ionic conductivity: a conductivity meter, model DDSJ-308F, was used to measure the ionic conductivity of the wide voltage window aqueous electrolyte solution forming an SEI film based on a physical process.
3. electrochemical performance: an electrochemical workstation, model PGSTAT302N (Metrohm Autolab B.V.), was used to conduct electrochemical performance tests on button capacitors and pouch capacitors to obtain performance information such as impedance, rate performance or cycle life thereof.

Comparative Example 1

The specific composition of the electrolyte solution in this comparative example: the solvent was water, and the solute was sodium nitrate. The specific preparation method thereof was as follows: sodium nitrate was added into water according to the proportion of a sodium nitrate/water weight ratio of 0.17/1 and dissolved, and then mixed uniformly to obtain a $NaNO_3$ solution in this comparative example.

The performance test was conducted on the $NaNO_3$ electrolyte solution obtained in this comparative example, and the specific method was as follows: Ag/AgCl was used as the reference electrode and stainless steel sheets as the working electrode and the counter electrode, a three-electrode system was adopted to conduct the electrochemical window stability test on the aqueous electrolyte solution. The test results showed that the electrochemical window was 1.39 V.

Example 1

The specific composition of the electrolyte solution in this example: the solvent was water, the solute was sodium nitrate, and the additive was 3-[dimethyl(n-octyl)ammonio]propane-1-sulfonate. The specific preparation method thereof was as follows: sodium nitrate was added into water according to the proportion of a sodium nitrate/water weight ratio of 0.17:1 and dissolved to obtain a $NaNO_3$ solution, and then 3-[dimethyl(n-octyl)ammonio]propane-1-sulfonate was added into the $NaNO_3$ solution according to the proportion of a 3-[dimethyl(n-octyl)ammonio]propane-1-sulfonate/water weight ratio of 0.9:1 and mixed uniformly to obtain a solution in this example.

The conductivity of the $NaNO_3$-based electrolyte solution obtained in Example 1 was tested using a conductivity meter, and the conductivity was 29 mS $cm^{-1}$.

The voltage window of the $NaNO_3$-based electrolyte solution obtained in Example 1 was tested according to the method in Comparative Example 1, and the voltage window was 2.71 V.

Example 2

The specific composition of the electrolyte solution in this example: the solvent was water, the solute was sodium nitrate, and the additive was 3-[dimethyl(n-octyl)ammonio]propane-1-sulfonate. The specific preparation method thereof was as follows: sodium nitrate was added into water according to the proportion of a sodium nitrate/water weight ratio of 0.17:1 and dissolved to obtain a $NaNO_3$ solution, and then 3-[dimethyl(n-octyl)ammonio]propane-1-sulfonate was added into the $NaNO_3$ solution according to the proportion of a 3-[dimethyl(n-octyl)ammonio]propane-1-sulfonate/water weight ratio of 1.4:1 and mixed uniformly to obtain a solution in this example.

The conductivity of the $NaNO_3$-based electrolyte solution obtained in Example 2 was tested using a conductivity meter, and the conductivity was 11 mS $cm^{-1}$.

The voltage window of the $NaNO_3$-based electrolyte solution obtained in Example 2 was tested according to the method in Comparative Example 1, and the voltage window was 2.76 V.

Example 3

The specific composition of the electrolyte solution in this example: the solvent was water, the solute was sodium nitrate, and the additive was a 3-(decyldimethylammonio)propane-1-sulfonate inner salt. The specific preparation method thereof was as follows: sodium nitrate was added into water according to the proportion of a sodium nitrate/water weight ratio of 0.17:1 and dissolved to obtain a $NaNO_3$ solution, and then the 3-(decyldimethylammonio)propane-1-sulfonate inner salt was added into the $NaNO_3$ solution according to the proportion of a 3-(decyldimethylammonio) propane-1-sulfonate inner salt/water weight ratio of 0.7:1 and mixed uniformly to obtain a solution in this example.

The conductivity of the $NaNO_3$-based electrolyte solution obtained in Example 3 was tested using a conductivity meter, and the conductivity was 42 mS $cm^{-1}$.

The voltage window of the $NaNO_3$-based electrolyte solution obtained in Example 3 was tested according to the method in Comparative Example 1, and the voltage window was 2.72 V.

Example 4

The specific composition of the electrolyte solution in this example: the solvent was water, the solute was sodium nitrate, and the additive was a dodecyldimethyl (3-sulfopropyl) ammonium hydroxide inner salt. The specific preparation method thereof was as follows: sodium nitrate was added into water according to the proportion of a sodium nitrate/water weight ratio of 0.17:1 and dissolved to obtain a $NaNO_3$ solution, and then the dodecyldimethyl (3-sulfopropyl) ammonium hydroxide inner salt was added into the $NaNO_3$ solution according to the proportion of a dodecyldimethyl (3-sulfopropyl) ammonium hydroxide inner salt/water weight ratio of 0.6:1 and mixed uniformly to obtain a solution in this example.

The conductivity of the $NaNO_3$-based electrolyte solution obtained in Example 4 was tested using a conductivity meter, and the conductivity was 46 mS $cm^{-1}$.

The voltage window of the $NaNO_3$-based electrolyte solution obtained in Example 4 was tested according to the method in Comparative Example 1, and the voltage window was 2.66 V.

Example 5

The specific composition of the electrolyte solution in this example: the solvent was water, the solute was potassium nitrate, and the additive was a 3-(decyldimethylammonio)propane-1-sulfonate inner salt. The specific preparation method thereof was as follows: potassium nitrate was added into water according to the proportion of a potassium nitrate/water weight ratio of 0.202:1 and dissolved to obtain a KNO3 solution, and then the 3-(decyldimethylammonio)propane-1-sulfonate inner salt was added into the KNO3 solution according to the proportion of a 3-(decyldimethylammonio)propane-1-sulfonate inner salt/water weight ratio of 0.7:1 and mixed uniformly to obtain a solution in this example.

The conductivity of the KNO3-based electrolyte solution obtained in Example 5 was tested using a conductivity meter, and the conductivity was 50 mS $cm^{-1}$.

The voltage window of the KNO3-based electrolyte solution obtained in Example 5 was tested according to the method in Comparative Example 1, and the voltage window was 2.68 V.

Example 6

The specific composition of the electrolyte solution in this example: the solvent was water, the solute was lithium nitrate, and the additive was a 3-(decyldimethylammonio)propane-1-sulfonate inner salt. The specific preparation method thereof was as follows: lithium nitrate was added into water according to the proportion of a lithium nitrate/water weight ratio of 0.13788:1 and dissolved to obtain a $LiNO_3$ solution, and then the 3-(decyldimethylammonio)propane-1-sulfonate inner salt was added into the $LiNO_3$ solution according to the proportion of a 3-(decyldimethylammonio)propane-1-sulfonate inner salt/water weight ratio of 0.7:1 and mixed uniformly to obtain a solution in this example.

The conductivity of the $LiNO_3$-based electrolyte solution obtained in Example 6 was tested using a conductivity meter, and the conductivity was 39 mS $cm^{-1}$.

The voltage window of the $LiNO_3$-based electrolyte solution obtained in Example 6 was tested according to the method in Comparative Example 1, and the voltage window was 2.75 V.

Example 7

The specific composition of the electrolyte solution in this example: the solvent was water, the solute was lithium sulfate, and the additive was a 3-(decyldimethylammonio)propane-1-sulfonate inner salt. The specific preparation method thereof was as follows: lithium sulfate was added into water according to the proportion of a lithium sulfate/water weight ratio of 0.1011:1 and dissolved to obtain a $Li_2SO_4$ solution, and then the 3-(decyldimethylammonio)propane-1-sulfonate inner salt was added into the $Li_2SO_4$ solution according to the proportion of a 3-(decyldimethylammonio)propane-1-sulfonate inner salt/water weight ratio of 0.7:1 and mixed uniformly to obtain a solution in this example.

The conductivity of the $Li_2SO_4$-based electrolyte solution obtained in Example 7 was tested using a conductivity meter, and the conductivity was 25 mS $cm^{-1}$.

The voltage window of the $Li_2SO_4$-based electrolyte solution obtained in Example 7 was tested according to the method in Comparative Example 1, and the voltage window was 2.83 V.

TABLE 1

Performance test results of aqueous electrolyte solutions
prepared in Comparative Example 1 and Examples 1-7

| Example | Voltage window (V) | Electrical conductivity (mS cm$^{-1}$) |
|---|---|---|
| Comparative Example 1 | 1.39 | |
| Example 1 | 2.71 | 29 |
| Example 2 | 2.76 | 11 |
| Example 3 | 2.72 | 42 |
| Example 4 | 2.66 | 46 |
| Example 5 | 2.68 | 50 |
| Example 6 | 2.75 | 39 |
| Example 7 | 2.83 | 25 |

Several performance parameters of the prepared wide voltage window aqueous electrolyte solution for forming an SEI film based on a physical process are shown in Table 1. When the same additive 3-[dimethyl(n-octyl)ammonio]propane-1-sulfonate was used, the conductivity of the obtained aqueous electrolyte solution when the ratio of the additive to water was 0.9 was significantly higher than that when the addition ratio was 1.4. Under different types of additives, the comprehensive performance of the electrolyte solution based on the 3-(decyldimethylammonio)propane-1-sulfonate inner salt in terms of electrical conductivity and voltage window was superior to that of the electrolyte solutions based on the other two additives. When the same additive 3-(decyldimethylammonio)propane-1-sulfonic acid internal salt was used, the windows and conductivities of the aqueous electrolyte solutions prepared by different electrolyte types for sodium nitrate, potassium nitrate, lithium nitrate and lithium sulfate are 2.72 V/42 mS cm$^{-1}$, 2.68 V/50 mS cm$^{-1}$, 2.75 V/39 mS cm$^{-1}$ and 2.83 V/25 mS cm$^{-1}$, respectively, where the electrolyte solution based on sodium nitrate had more optimized comprehensive performance compared with other electrolyte solutions.

Example 8

Figure 3:
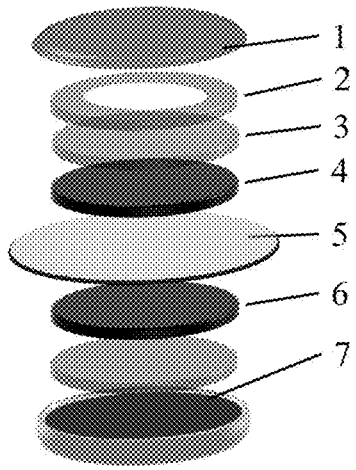
FIG. 3 is a schematic structural diagram of a button capacitor provided in Examples 8-9.

Example 8 was a symmetrical activated carbon button supercapacitor assembled using commercial (KURARAY COAL) YP-50F™ activated carbon as electrodes, and its internal structure is shown in FIG. 3, including: a button capacitor metal shell 1, a spring 2, a stainless steel gasket 3, an activated carbon positive electrode material 4, a glass fiber separator 5, an activated carbon negative electrode material 6 and a wide voltage window aqueous electrolyte solution 7 for forming an SEI film based on a physical process in Example 3.

Figure 4:
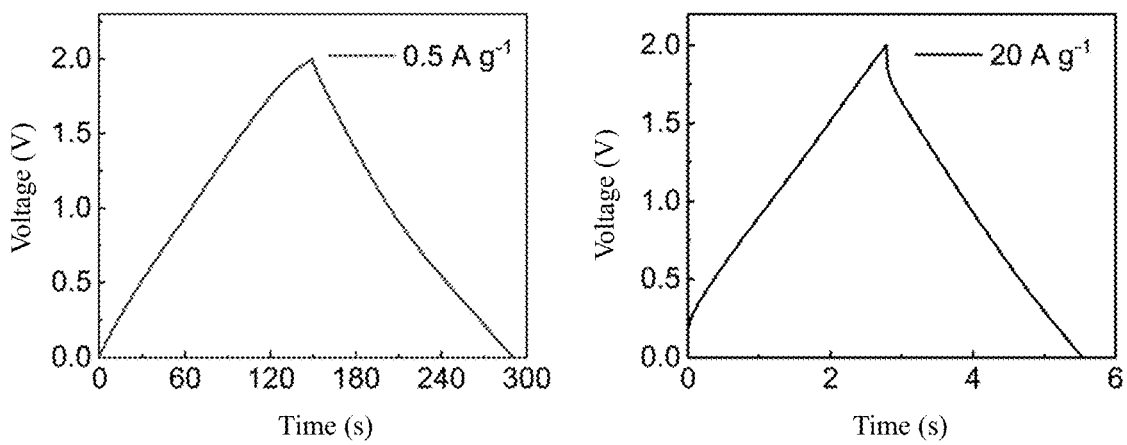
FIG. 4 is a curve graph of constant-current charge and discharge of a button supercapacitor provided in Example 8.
Figure 5:
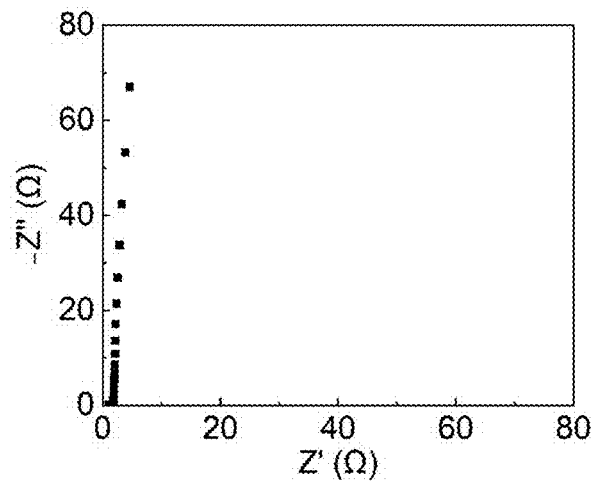
FIG. 5 is a Nyquist diagram of a button supercapacitor obtained from an EIS test provided in Example 8.

The wide voltage window aqueous electrolyte solution for forming an SEI film based on a physical process was prepared by the method in Example 3. The activated carbon electrodes were made by mixing the (KURARAY COAL) YP-50F™ activated carbon material/carbon black/SBR/CMC in a weight ratio of 85/10/3/2 to form a slurry, coating the slurry onto a stainless steel mesh current collector, and drying by baking. The symmetrical button supercapacitor prepared in Example 8 was tested for electrochemical performance. The voltage window for a charge-discharge test was set to 0-2 V, and the current density range was 0.5-20 A g$^{-1}$. The mass specific capacitance of symmetrical supercapacitor at different sweep speeds can be calculated from the curve of constant-current charge and discharge, and then the rate performance of the capacitor was be obtained. As shown in FIG. 4, the capacity retention rate was 81.7% (36.6 to 29.9 F g$^{-1}$) under a large variation in current density from 0.5 A g$^{-1}$ to 20 A g$^{-1}$. As shown in FIG. 5, the Electrochemical Impedance Spectroscopy (EIS) test indicated that the equivalent series resistance of the symmetrical supercapacitor was very small. In the low-frequency range, the Nyquist diagram showed an almost vertical line, which was characteristic of capacitive behavior. In the high-frequency range, the relatively small semicircle indicated that the resistance of ion transport was relatively small. Therefore, the wide voltage window aqueous electrolyte solution for forming an SEI film based on a physical process provided in the present invention significantly improved the impedance and rate performance of the aqueous energy storage device under the condition of an improved voltage window.

Comparative Example 2

Comparative Example 2 was an activated carbon//Ni—Fe Prussian blue button ionic capacitor assembled using commercial YP-50F activated carbon as a negative electrode and Ni—Fe Prussian blue (NiHCF) as a positive electrode, and its internal structure is shown in FIG. 3, including: the button capacitor metal shell 1, the spring 2, the stainless steel gasket 3, a NiHCF positive electrode material 4, the glass fiber separator 5, the activated carbon negative electrode material 6 and a NaNO$_3$ aqueous electrolyte solution 7 in Comparative Example 1.

Figure 6:
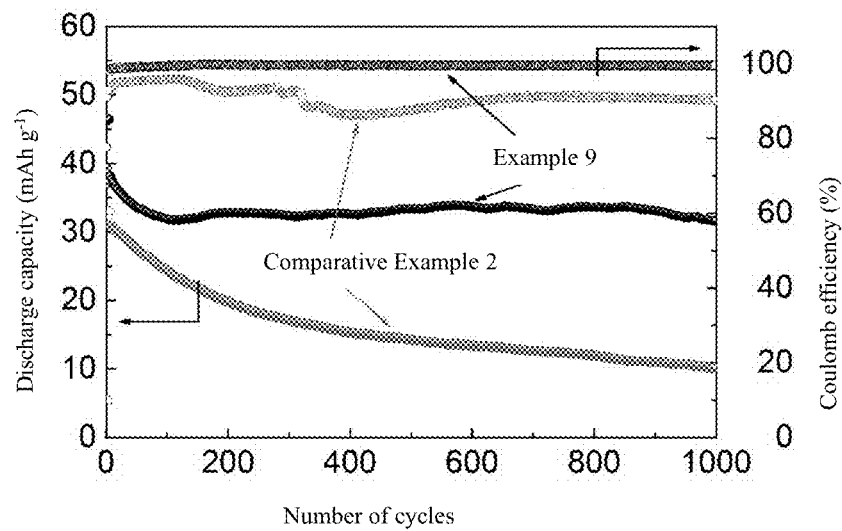
FIG. 6 is a curve graph of cycle lives of button ionic capacitors provided in Example 9 and Comparative Example 2.

The NaNO$_3$ aqueous electrolyte solution was prepared by the method in Comparative Example 1. The activated carbon electrodes were made by mixing the (KURARAY COAL) YP-50F™ activated carbon material/carbon black/SBR/CMC in a weight ratio of 85/10/3/2 to form a slurry, coating the slurry onto aluminum foil, and drying by baking. The Ni—Fe Prussian blue (NiHCF) was made by mixing the NiHCF material/carbon black/SBR/CMC in a weight ratio of 85/10/3/2 to form a slurry, coating the slurry onto titanium foil, and drying by baking. The activated carbon//Ni—Fe Prussian blue button-type ion capacitor prepared in Comparative Example 2 was subjected to charge-discharge tests at 0-2 V. As shown in FIG. 6, when the current density was 0.5 A g$^{-1}$, after 1000 cycles at room temperature, the capacity retention rate was only 25.7%.

Example 9

Example 9 was an activated carbon//Ni—Fe Prussian blue button ionic capacitor assembled using commercial (KURARAY COAL) YP-50F™ activated carbon as a negative electrode and Ni—Fe Prussian blue (NiHCF) as a positive electrode, and its internal structure is shown in FIG. 3, including: the button capacitor metal shell 1, the spring 2, the stainless steel gasket 3, the NiHCF positive electrode material 4, the glass fiber separator 5, the activated carbon negative electrode material 6 and the wide voltage window aqueous electrolyte solution 7 for forming an SEI film based on a physical process in Example 3.

The wide voltage window aqueous electrolyte solution for forming an SEI film based on a physical process was prepared by the method in Example 3. The activated carbon electrodes were made by mixing the (KURARAY COAL) YP-50F™ activated carbon material/carbon black/SBR/CMC in a weight ratio of 85/10/3/2 to form a slurry, coating the slurry onto aluminum foil, and drying by baking. The Ni—Fe Prussian blue (NiHCF) was made by mixing the NiHCF material/carbon black/SBR/CMC in a weight ratio of 85/10/3/2 to form a slurry, coating the slurry onto titanium foil, and drying by baking. The activated carbon//Ni—Fe Prussian blue button-type ion capacitor prepared in Example 9 was subjected to charge-discharge tests at 0-2 V. As shown in FIG. 6, when the current density was 0.5 A g$^{-1}$, after 1000 cycles at room temperature, the capacity retention rate was 81.5%, showing excellent electrochemical performance.

The wide voltage window aqueous electrolyte solution for forming an SEI film based on a physical process provided in the present invention significantly improved the capacity and cycle life of the aqueous energy storage device.

Example 10

Figure 7:
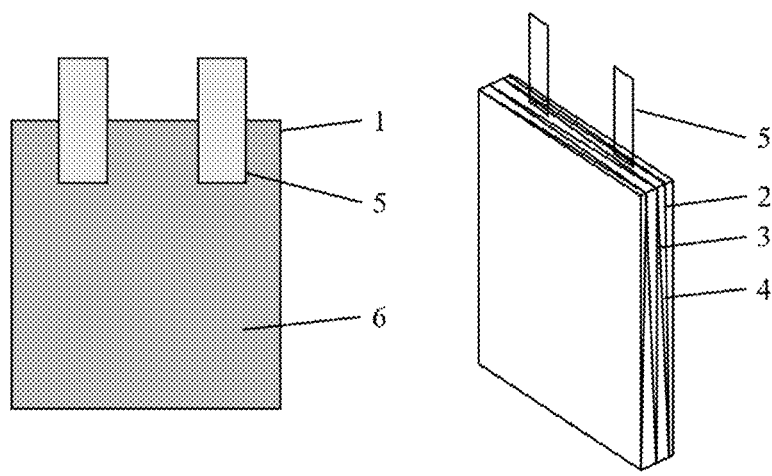
FIG. 7 is a schematic structural diagram of a pouch capacitor provided in Example 10.

Example 10 was a symmetrical activated carbon pouch supercapacitor assembled using commercial (KURARAY COAL) YP-50F™ activated carbon as electrodes, and its internal structure is shown in FIG. 7, including: an aluminum-plastic film shell 1, a positive electrode plate 2, a negative electrode plate 3, a tab 4, a separator 5 located between the positive electrode plate and the negative electrode plate, and a wide voltage window aqueous electrolyte solution 6 for forming an SEI film based on a physical process in Example 3.

The wide voltage window aqueous electrolyte solution for forming an SEI film based on a physical process was prepared by the method in Example 3. The activated carbon electrodes were prepared by mixing the (KURARAY COAL) YP-50F™ activated carbon material/carbon black/SBR/CMC in a weight ratio of 85/10/3/2 to form a slurry, coating the slurry onto aluminum foil, and then going through coating and rolling. The activated carbon electrode has a thickness of 93 μm and an area loading capacity of 10.1 mg cm$^{-2}$. The symmetrical activated carbon pouch supercapacitor prepared in Example 10 was tested for electrochemical performance. The voltage window of a charge-discharge test was set to 0-2 V, and it was found that the capacity retention rate reached 77% from a rate of 2° C. to a rate of 100° C., which demonstrated that the aqueous electrolyte solution in Example 1 had excellent practical application performance.

It can be seen from the above that the wide voltage window aqueous electrolyte solution for forming an SEI film based on a physical process provided in the present invention can not only broaden the voltage window of the aqueous electrolyte solution, but also maintain good ionic conductivity, providing excellent rate performance and cycle performance for electrochemical devices. In addition, the aqueous electrolyte solution provided in the present invention can also be applied to button capacitors and industrial-grade pouch supercapacitors, and can maintain excellent electrochemical performance under various environmental conditions.

The above is a detailed description of the present invention in combination with the examples, but the embodiments of the present invention are not limited by the above examples. Any other changes, replacements, combinations, simplifications, etc. made under the core guiding ideology of the present invention patent are all included within the scope of protection of the present invention patent.

What is claimed is:

1. A wide voltage window aqueous electrolyte solution for forming a solid-electrolyte interphase (SEI) film based on a physical process, comprising an additive, an electrolyte and water, wherein
the additive is a long-chain compound having both opposite charge functional groups and having opposite wettability; and
the electrolyte is a soluble inorganic salt of an alkali metal;
wherein the long-chain compound having both opposite charge functional groups and having opposite wettability is at least one of 3-[dimethyl(n-octyl) ammonio] propane-1-sulfonate, a 3-(decyldimethylammonio) propane-1-sulfonate inner salt and a dodecyldimethyl (3-sulfopropyl) ammonium hydroxide inner salt.

2. The wide voltage window aqueous electrolyte solution for forming an SEI film based on a physical process according to claim 1, wherein the soluble inorganic salt of the alkali metal comprises at least one of sodium nitrate, potassium nitrate, lithium nitrate and lithium sulfate.

3. The wide voltage window aqueous electrolyte solution for forming an SEI film based on a physical process according to claim 1, wherein a mass ratio of the soluble inorganic salt of the alkali metal to water is 0.1:1 to 0.3:1.

4. The wide voltage window aqueous electrolyte solution for forming an SEI film based on a physical process according to claim 1, wherein a mass ratio of the additive to water is 0.5:1 to 1.5:1.

5. The wide voltage window aqueous electrolyte solution for forming an SEI film based on a physical process according to claim 1, wherein an electrochemical window of the aqueous electrolyte solution is greater than 1.5 V.

6. A method for preparing the wide voltage window aqueous electrolyte solution for forming an SEI film based on a physical process according to claim 1, comprising steps of:
(1) mixing the soluble inorganic salt of the alkali metal with water and stirring to prepare a salt solution; and
(2) adding the additive to the salt solution obtained in step (1) and mixing uniformly to obtain the wide voltage window aqueous electrolyte solution for forming the SEI film based on the physical process.

7. Use of the wide voltage window aqueous electrolyte solution for forming an SEI film based on a physical process according to claim 1 in an electrochemical energy storage device.

8. The use of the wide voltage window aqueous electrolyte solution for forming an SEI film based on a physical process in an electrochemical energy storage device according to claim 7, wherein the electrochemical energy storage device is a button supercapacitor, a button ionic capacitor or a pouch supercapacitor.

9. The use of the wide voltage window aqueous electrolyte solution for forming an SEI film based on a physical process in an electrochemical energy storage device according to claim 8, wherein
the button supercapacitor is a symmetrical activated carbon button supercapacitor, an electrode is an activated carbon electrode, and an electrolyte solution adopts the wide voltage window aqueous electrolyte solution for forming an SEI film based on a physical process;
the button ionic capacitor is an activated carbon//Ni—Fe Prussian blue NiHCF button ionic capacitor, a positive electrode is a NiHCF electrode, a negative electrode is an activated carbon electrode, and an electrolyte solution adopts the wide voltage window aqueous electrolyte solution for forming an SEI film based on a physical process; and
the pouch supercapacitor is a symmetrical activated carbon pouch supercapacitor, an electrode is an activated carbon electrode, a thickness of the activated carbon electrode is 80-110 μm, an area loading capacity is 9-12 mg cm$^{-2}$, and an electrolyte solution adopts the wide voltage window aqueous electrolyte solution for forming an SEI film based on a physical process.

\* \* \* \* \*